(12) United States Patent
Hayashida et al.

(10) Patent No.: US 8,530,081 B2
(45) Date of Patent: Sep. 10, 2013

(54) NONAQUEOUS ELECTROLYTE SECONDARY BATTERY INCLUDING POSITIVE ELECTRODE ACTIVE MATERIAL LAYERS HAVING PARALLEL GROOVES

(75) Inventors: Hirotaka Hayashida, Fujisawa (JP); Akira Yajima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 173 days.

(21) Appl. No.: 12/411,116

(22) Filed: Mar. 25, 2009

(65) Prior Publication Data

US 2009/0181310 A1 Jul. 16, 2009

Related U.S. Application Data

(63) Continuation of application No. 11/245,040, filed on Oct. 7, 2005, now abandoned, which is a continuation of application No. 10/962,826, filed on Oct. 12, 2004, now abandoned, which is a continuation of application No. PCT/JP03/04636, filed on Apr. 11, 2003.

(30) Foreign Application Priority Data

Apr. 12, 2002 (JP) ................................ 2002-110851
Mar. 25, 2003 (JP) ................................ 2003-083135

(51) Int. Cl.
*H01M 2/16* (2006.01)
(52) U.S. Cl.
USPC .............. 429/209; 429/233; 429/122; 429/94
(58) Field of Classification Search
USPC .................... 429/122, 209, 94, 233
See application file for complete search history.

(56) References Cited

U.S. PATENT DOCUMENTS

| 5,487,961 | A | 1/1996 | Strangways et al. |
| 7,335,448 | B2 * | 2/2008 | Kaito et al. ................... 429/323 |
| 2003/0224242 | A1 | 12/2003 | Kaito et al. |

FOREIGN PATENT DOCUMENTS

| DE | 102 15 305 A1 | 10/2003 |
| EP | 0 967 672 A1 | 12/1999 |
| EP | 1 018 773 A1 | 12/2000 |
| JP | 5-41211 | 2/1993 |
| JP | 7-272760 | 10/1995 |

(Continued)

OTHER PUBLICATIONS

Machine Translation of JP 2002-05764 of Aihara et al.*
Extended European Search Report issued on Nov. 5, 2010, in Application No. 10008773.3.

*Primary Examiner* — Milton I Cano
*Assistant Examiner* — Stephen Yanchuk
(74) *Attorney, Agent, or Firm* — Oblon, Spivak, McClelland, Maier & Neustadt, L.L.P.

(57) ABSTRACT

A nonaqueous electrolyte secondary battery includes an electrode assembly having a high-density positive electrode in which a positive electrode active material layer is formed on at least one surface of a positive electrode current collector, a high-density negative electrode in which a negative electrode active material layer is formed on at least one surface of a negative electrode current collector, and a separator interposed between the positive and negative electrodes, and has a structure in which the electrode assembly is impregnated with a nonaqueous electrolyte, wherein the specific surface area per unit area of the positive electrode active material layer of the positive electrode is 0.5 to 1.0 times the specific surface area per unit area of the negative electrode active material layer of the negative electrode which opposes the positive electrode with the separator sandwiched between them.

7 Claims, 6 Drawing Sheets (56) References Cited

FOREIGN PATENT DOCUMENTS

| | | |
|---|---|---|
| JP | 11-86870 | 3/1999 |
| JP | 2000-173597 | 6/2000 |
| JP | 2001-23612 | 1/2001 |
| JP | 2001-176558 | 6/2001 |
| JP | 2001-357836 | 12/2001 |
| JP | 2002-15764 | 1/2002 |

* cited by examiner

NONAQUEOUS ELECTROLYTE SECONDARY BATTERY INCLUDING POSITIVE ELECTRODE ACTIVE MATERIAL LAYERS HAVING PARALLEL GROOVES

This application is a Continuation application of U.S. application Ser. No. 11/245,040 filed Oct. 7, 2005, which is a Continuation application of U.S. application Ser. No. 10/962,826 filed Oct. 12, 2004, which is a Continuation application of PCT Application No. PCT/JP03/04636, filed Apr. 11, 2003, which was not published under PCT Article 21(2) in English.

This application is based upon and claims the benefit of priority from prior Japanese Patent Applications No. 2002-110851, filed Apr. 12, 2002; and No. 2003-083135, filed Mar. 25, 2003, the entire contents of both of which are incorporated herein by reference.

BACKGROUND OF THE INVENTION

1. Field of the Invention

The present invention relates to a nonaqueous electrolyte secondary battery.

2. Description of the Related Art

As a lithium ion secondary battery, a battery having an arrangement using a lithium composite oxide as a positive electrode active material and a carbonaceous material, which allows doping and undoping of lithium ions, as a negative electrode active material is known. This lithium ion secondary battery is expected to be used as a superior power supply because the battery is small and light, the voltage of a single cell is high, and a high energy density can be obtained.

The conventional lithium ion secondary battery realizes a high energy density by using highly densified positive and negative electrodes. However, in this lithium ion secondary battery including the highly densified positive and negative electrodes, the initial characteristics, particularly, the discharge characteristics when a large electric current is discharged are unstable, and the charge/discharge cycle characteristics deteriorate.

Jpn. Pat. Appln. KOKAI Publication No. 11-86870 discloses a positive electrode in which linear grooves are formed in a depolarizing mix layer formed on the main surface of a current collector and containing a material which participates in an electrochemical reaction, such that the two ends of each groove open at the edges of the depolarizing mix layer. The principal object of this invention is, if the internal temperature of the battery rises due to a shortcircuit or an abnormal electric current and the electrode material or electrolyte gasifies, to rapidly move the gas outside the electrode through the grooves. A reduction in liquid injection time is also described as a secondary effect of the grooves. However, this invention does not mention, e.g., the selection of the form of the grooves in relation to the battery characteristics such as the large-current discharge characteristics or cycle life characteristics.

BRIEF SUMMARY OF THE INVENTION

The present inventors made extensive studies on factors by which the initial characteristics, particularly, the discharge characteristics when a large electric current is discharged become unstable in a high-energy-density, nonaqueous electrolyte secondary battery including high-density positive and negative electrodes, i.e., low-void positive and negative electrodes. As a result, the present inventors have found that there is a large difference between the values of permeability of a nonaqueous electrolyte to the high-density positive electrode and the high-density negative electrode (more specifically, the permeation speed of an electrolyte at the negative electrode is much higher than that of the electrolyte at the positive electrode), and this causes a nonuniform nonaqueous electrolyte permeation distribution between the positive and negative electrodes.

The present inventors also made extensive studies on deterioration of the charge/discharge cycle characteristics of a high-energy-density, nonaqueous electrolyte secondary battery including high-density positive and negative electrodes, i.e., low-void positive and negative electrodes. As a result, the present inventors have found that the negative electrode has a volume change larger than that of the positive electrode during a charge/discharge cycle and hence easily swells, so the electrolyte often moves toward the negative electrode when the charge/discharge cycle is repeated, and this prevents sufficient supply of the electrolyte to the positive electrode at the charge/discharge cycle progresses.

On the basis of these findings, the present inventors made further extensive studies, and made it possible, by defining the specific surface area per unit area of a positive electrode active material of the positive electrode to 0.5 to 1.0 times the specific surface area per unit area of a negative electrode active material of the negative electrode which opposes the positive electrode with a separator sandwiched between them, to balance the speeds of permeation of the nonaqueous electrolyte to the positive and negative electrodes, to make uniform the nonaqueous electrolyte permeation distribution between the positive and negative electrodes, and to impregnate the positive electrode with a sufficient amount of the nonaqueous electrolyte, when an electrode assembly having the positive and negative electrodes and the separator was accommodated in an outer packaging member such as a metal can, and the nonaqueous electrolyte was supplied to the outer packaging member. Consequently, the present inventors could obtain a high-energy-density, nonaqueous electrolyte secondary battery in which the initial characteristics, particularly, the charge characteristics when a large electric current was discharged stabilized and the charge/discharge cycle characteristics improved, and completed the present invention.

Also, the present inventors made it possible, by forming grooves having a specific form in a positive electrode active material formation surface of a positive electrode, to balance the speeds of permeation of a nonaqueous electrolyte to the positive and negative electrodes, to make uniform the nonaqueous electrolyte permeation distribution between the positive and negative electrodes, and to impregnate the positive electrode with a sufficient amount of the nonaqueous electrolyte, when an electrode assembly having the positive and negative electrodes and the separator was accommodated in an outer packaging member such as a metal can, and the nonaqueous electrolyte was supplied to the outer packaging member. Consequently, the present inventors could obtain a high-energy-density, nonaqueous electrolyte secondary battery in which the initial characteristics, particularly, the charge characteristics when a large electric current was discharged stabilized and the charge/discharge cycle characteristics improved, and completed the present invention.

According to the present invention, there is provided a nonaqueous electrolyte secondary battery comprising an electrode assembly having a high-density positive electrode in which a positive electrode active material layer is formed on at least one surface of a positive electrode current collector, a high-density negative electrode in which a negative electrode active material layer is formed on at least one surface of a negative electrode current collector, and a separator interposed between the positive and negative electrodes, and having a structure in which the electrode assembly is impregnated with a nonaqueous electrolyte, wherein a specific surface area per unit area of the positive electrode active material layer of the positive electrode is 0.5 to 1.0 times a specific surface area per unit area of the negative electrode active material layer of the negative electrode which opposes the positive electrode with the separator sandwiched between them.

According to the present invention, there is provided a nonaqueous electrolyte secondary battery comprising an electrode assembly having a high-density positive electrode in which a positive electrode active material layer is formed on at least one surface of a positive electrode current collector, a high-density negative electrode in which a negative electrode active material layer is formed on at least one surface of a negative electrode current collector, and a separator interposed between the positive and negative electrodes, and having a structure in which the electrode assembly is impregnated with a nonaqueous electrolyte, wherein a plurality of grooves are formed in a formation surface of the positive electrode active material layer of the positive electrode, such that end portions of the grooves open at edges of the positive electrode active material layer, and the grooves are formed at a frequency of 1 to 10 grooves per mm of the positive electrode active material layer, and a sectional area of the grooves account for a ratio of 1 to 20% of a sectional area of the positive electrode active material layer.

DETAILED DESCRIPTION OF THE INVENTION

Referring now to the drawings, wherein like reference numerals designate identical or corresponding parts throughout the several views.

The present invention will be described in detail below.
First Embodiment

This nonaqueous electrolyte secondary battery includes an electrode assembly having a high-density positive electrode obtained by forming a positive electrode active material layer on at least one surface of a positive electrode current collector, a high-density negative electrode obtained by forming a negative electrode active material on at least one surface of a negative electrode current collector, and a separator interposed between the positive and negative electrodes. The electrode assembly and a nonaqueous electrolyte are accommodated in an outer packaging member.

The high-density positive electrode, high-density negative electrode, separator, and nonaqueous electrolyte will be explained below.

1) High-Density Positive Electrode

By "high-density positive electrode" is meant that the electrode density is 3.0 g/cm$^3$ or more (preferably, 3.1 g/cm$^3$ to 3.5 g/cm$^3$).

The high-density positive electrode is formed by, e.g., the following methods.

1-1) First, a depolarizing mix slurry is prepared by suspending a positive electrode active material, conductive material, and binder in an appropriate solvent. One or two surfaces of a substrate as a current collector are coated with this depolarizing mix slurry, the substrate is dried to form a thin plate, and this thin plate is cut into desired dimensions to manufacture a high-density positive electrode.

1-2) First, a positive electrode active material, conductive material, and binder are molded into pellets, or kneaded and formed into a sheet. Then, the pellets or sheet is made to adhere to a current collector to manufacture a high-density positive electrode.

The positive electrode active material is not particularly limited as long as it can easily absorb and desorb lithium ions during charge and discharge. More specifically, lithium cobaltate, lithium nickelate, lithium manganate, lithium-containing iron oxide, or vanadium oxide containing lithium is used as the positive electrode active material, and the positive electrode active material is preferably made of any of these composite oxides or their mixture. The positive electrode active material can also contain, e.g., manganese dioxide, titanium disulfide, or molybdenum disulfide.

The positive electrode active material is preferably a particulate material having an average particle size of 2 to 20 μm, when the adhesion to a substrate during the manufacture of the electrode and the electrochemical characteristics are taken into consideration.

Examples of the conductive material are acetylene black, carbon black, and graphite.

As the binder, it is possible to use, e.g., polyvinylidene fluoride (PVdF), a vinylidene fluoride-propylene hexafluoride copolymer, a vinylidene fluoride-tetrafluoroethylene-propylene hexafluoride ternary copolymer, a vinylidene fluoride-pentafluoropropylene copolymer, a vinylidene fluoride-chlorotrifluoroethylene copolymer, a tetrafluoroethylene-purple fluoroalkylvinylether (PFA)-vinylidene fluoride ternary copolymer, a tetrafluoroethylene-ethylene-vinylidene fluoride ternary copolymer, a chlorotrifluoroethylene-vinylidene fluoride copolymer, a chlorotrifluoroethylene-ethylene-vinylidene fluoride ternary copolymer, a vinyl fluoride-vinylidene fluoride copolymer, an ethylene-propylene-diene copolymer (EPDM), or styrene-butadiene rubber (SBR).

As the current collector, it is possible to use, e.g., aluminum foil, stainless steel foil, or titanium foil. However, the current collector is most preferably aluminum foil when tensile strength, electrochemical stability, flexibility during winding, and the like are taken into consideration. The thickness of the foil is preferably 10 to 30 μm. If the thickness of the foil is less than 10 μm, not only can the strength as an electrode not be obtained any longer, but also strain introduced by expansion and contraction of the active material caused by a charge/discharge reaction cannot be relaxed any longer, and this may break the positive electrode. In contract, if the thickness of the foil exceeds 30 μm, not only the filling amount of the active material is reduced, but also the flexibility of the positive electrode is lost, and this may allow easy occurrence of an internal short circuit.

2) High-Density Negative Electrode

By "high-density negative electrode" is meant that the electrode density is 1.3 g/cm$^3$ or more (preferably, 1.35 g/cm$^3$ to 1.60 g/cm$^3$).

The high-density negative electrode is formed by, e.g., the following methods.

2-1) First, a depolarizing mix slurry is prepared by suspending a negative electrode active material, conductive material, and binder in an appropriate solvent. One or two surfaces of a substrate as a current collector are coated with this depolarizing mix slurry, the substrate is dried to form a thin plate, and this thin plate is cut into desired dimensions to manufacture a high-density negative electrode.

2-2) First, a negative electrode active material, conductive material, and binder are molded into pellets, or kneaded and formed into a sheet. Then, the pellets or sheet is made to adhere to a current collector to manufacture a high-density negative electrode.

An example of the negative electrode active material is a compound which absorbs and desorbs lithium ions. Examples of the compound which absorbs and desorbs lithium ions are conductive polymers capable of doping lithium ions, such as polyacetal, polyacetylene, and polypyrrol, carbon materials capable of doping lithium ions, such as coke, carbon fibers, graphite, mesophase frequency-based carbon, a pyrolytic gas-phase carbon substance, and a resin sintered product, and chalcogen compounds such as titanium disulfide, molybdenum disulfide, and niobium selenide. Examples of the forms of the carbon materials are a graphite-based carbon material, a carbon material containing both a graphite crystal portion and amorphous portion, and a carbon material having a stacked structure in which a crystal layer is irregular.

As the binder, it is possible to use, e.g., polytetrafluoroethylene, polyvinylidene fluoride, an ethylene-propylene-diene copolymer, styrene-butadiene rubber, or carboxymethylcellulose. As the metal foil, it is possible to use copper foil, nickel foil, or stainless steel foil.

3) Separator

This separator is formed from a porous sheet or the like. As this porous sheet, a porous film, unwoven fabric, or the like can be used.

The porous sheet is preferably made of at least one type of material selected from, e.g., polyolefin and cellulose. Examples of the polyolefin are polyethylene, polypropylene, an ethylene-propylene copolymer, and an ethylene-butene copolymer. In particular, a porous film made of one or both of polyethylene and polypropylene can improve the safety of a secondary battery.

4) Nonaqueous Electrolyte

This nonaqueous electrolyte can improve the ionic conductivity. This nonaqueous electrolyte is prepared by, e.g., dissolving a lithium salt in a nonaqueous solvent.

Examples of the nonaqueous solvent are propylene carbonate (PC), ethylene carbonate (EC), dimethyl carbonate (DMC), diethyl carbonate (DEC), 1,2-dimethoxyethane (DME), .gamma.-butyrolactone (.gamma.-BL), tetrahydrofuran (THF), 2-methyltetrahydrofuran (2-MeTHF), 1,3-dioxolane, 1,3-dimethoxypropane, and vinylene carbonate (VC). As these nonaqueous solvents, it is possible to use a solvent mixture of one type or two or more types selected from the types described above.

Of the above nonaqueous solvents, (1) a nonaqueous solvent containing EC and .gamma.-BL, (2) a nonaqueous solvent containing EC, .gamma.-BL, and VC, (3) a nonaqueous solvent containing EC, .gamma.-BL, and PC, and (4) a nonaqueous solvent containing EC, .gamma.-BL, PC, and VC are preferable. Nonaqueous solvents 2 and 4 are particularly preferable. In nonaqueous solvents 1 to 4 described above, the volume ratio of .gamma.-BL is preferably 30 vol % or more and 90 vol % or less.

As the lithium salt (electrolyte), it is possible to use, e.g., lithium perchlorate (LiClO$_4$), lithium borofluoride (LiB$_4$), lithium arsenic hexafluoride (LiAsF$_6$), lithium phosphate hexafluoride (LiPF$_6$), lithium trifluoromethasulfonate (LiCF$_3$SO$_3$), or lithium aluminum tetrachloride (LiAlCl$_4$). As the lithium salt, it is possible to use one type or two or more types selected from the types described above. In particular, lithium borofluoride (LiBF$_4$) is preferable because the generation of gas during initial charging can be suppressed.

In the positive and negative electrodes of 1 and 2 described above, the specific surface area per unit area of a positive electrode active material layer of the positive electrode is 0.5 to 1.0 times the specific surface area per unit area of a negative electrode active material layer of the negative electrode which opposes the positive electrode with the separate sandwiched between them. If the specific surface area per unit area of the positive electrode active material layer of the positive electrode is less than 0.5 times that of the negative electrode active material layer of the negative electrode, the effect of drawing the nonaqueous electrolyte to the positive electrode becomes unsatisfactory when the electrode assembly having the positive electrode, negative electrode, and separator is accommodated in an outer packaging member, e.g., an outer packaging member made up of a metal can and covers, and the nonaqueous electrolyte is supplied to the outer packaging member. As a consequence, the nonaqueous electrolyte permeation distribution becomes nonuniform between the positive and negative electrodes. In contrast, if the specific surface area per unit area of the positive electrode active material layer of the positive electrode exceeds 1.0 times that of the negative electrode active material layer of the negative electrode, the strength of the positive electrode active material layer is reduced, and the positive electrode active material layer peels off from the current collector. The specific surface area per unit area of the positive electrode active material layer of the positive electrode is more preferably 0.6 to 0.9 times the specific surface area per unit area of the negative electrode active material layer of the negative electrode.

Note that the positive electrode meeting the relationship between the specific surface areas of the positive and negative electrodes can take a form in which a plurality of circular or rectangular embosses are formed in the formation surface of the positive electrode active material layer, in addition to a form to be described later in which grooves to be described later are formed in the formation surface of the positive electrode active material layer.

Examples of the nonaqueous electrolyte secondary battery according to the present invention are a cylindrical type shown in FIG. 1, a square type shown in FIG. 2, and a thin type shown in FIGS. 3 and 4 to be explained below.

(1) Cylindrical Nonaqueous Electrolyte Secondary Battery

Figure 1:
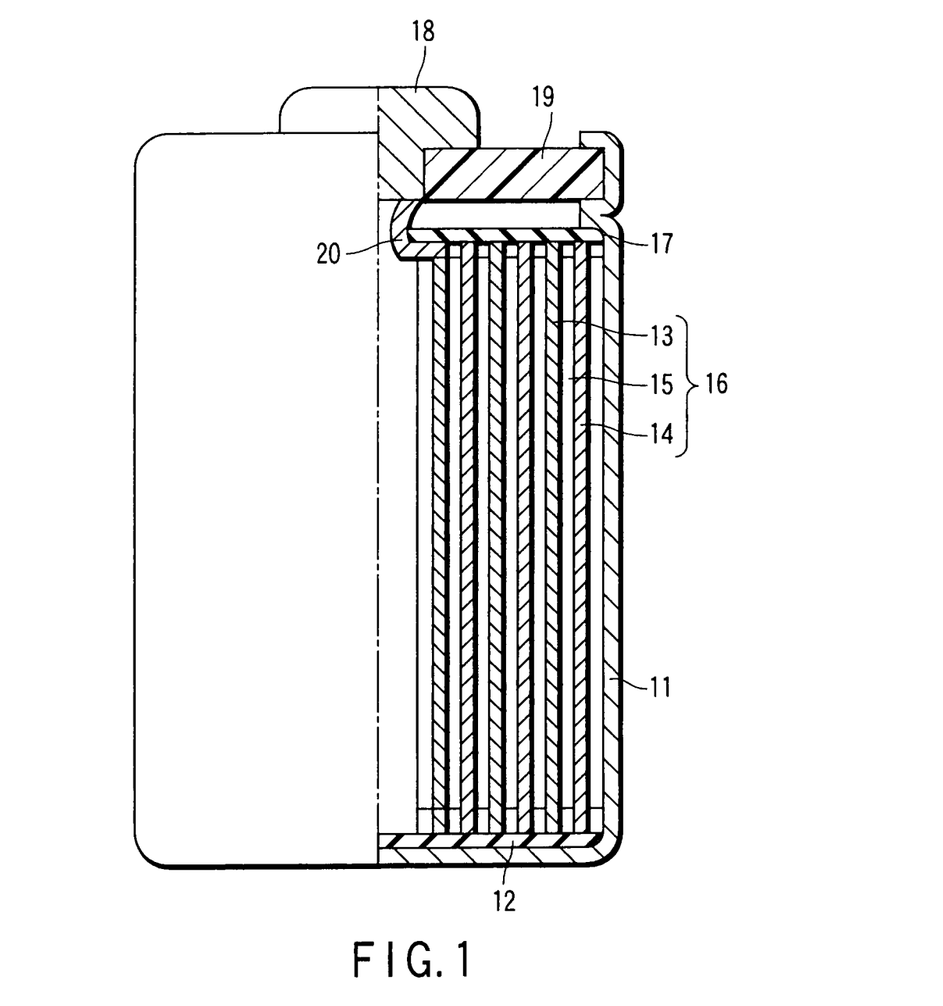
FIG. 1 is a partial sectional view showing a cylindrical type-lithium ion secondary battery as a form of a nonaqueous electrolyte secondary battery according to the present invention.

As shown in FIG. 1, a closed-end, cylindrical outer packaging can 11 which is made of a metal such as aluminum or stainless steel and also functions as a negative terminal has an insulating plate 12 on its bottom portion. An electrode assembly 16 obtained by spirally winding a positive electrode 13 and negative electrode 14 is contained in the outer packaging can 11. A nonaqueous electrolyte is injected from an opening into the outer packaging can 1 containing the electrode assembly 16.

An insulating plate 17 is so placed as to be positioned above the electrode assembly 16 in the outer packaging can 11. A sealing plate 19 made of an insulating material is airtightly attached to the opening of the outer packaging can 11 by caulking. A positive terminal 18 is fitted near the center of the sealing plate 19. That end face of the positive terminal 18, which is positioned in the outer packaging can 11 is connected to the positive electrode 13 via a positive electrode tab 20. The outer packaging can 11 which also functions as a negative terminal is connected to the negative electrode 14 via a negative electrode tab, and the bottom portion of the outer packaging can 11 is used as a negative terminal.

(2) Square Nonaqueous Secondary Battery

Figure 2:
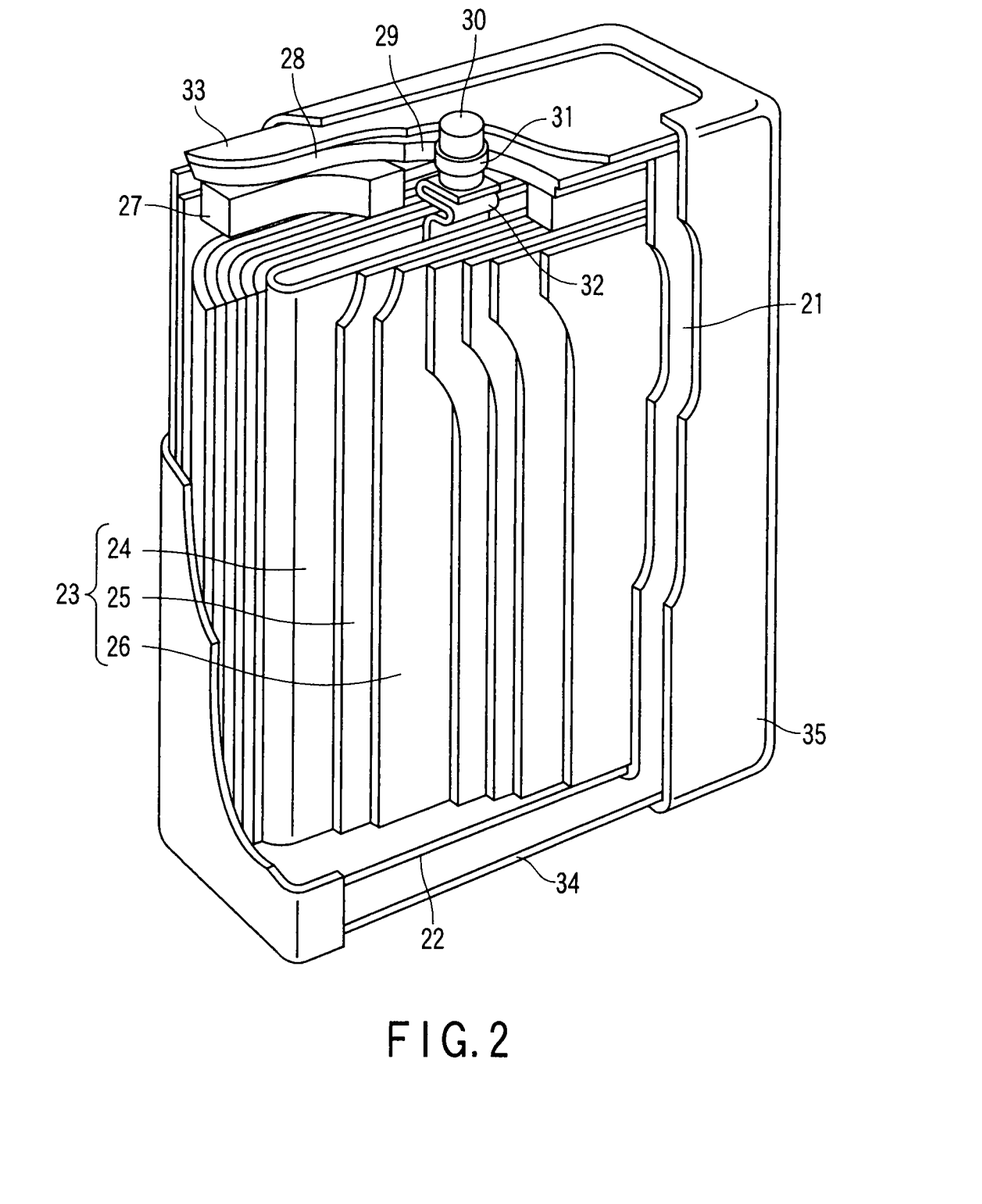
FIG. 2 is a partially cutaway perspective view showing a square type-lithium ion secondary battery as another form of the nonaqueous electrolyte secondary battery according to the present invention.

A closed-end, rectangular cylindrical outer packaging can 21 made of a metal such as aluminum shown in FIG. 2 also functions as, e.g., a positive terminal, and an insulating film 22 is formed on the inner surface of its bottom portion. An electrode assembly 23 is contained in the outer packaging can 21. Note that if the outer packaging can 21 is made of stainless steel or iron, it also functions as a negative terminal. The electrode assembly 23 is formed by spirally winding a negative electrode 24, separator 25, and positive electrode 26 such that the positive electrode 26 is positioned on the outermost circumference, and press-molding the resultant structure into a flat shape. A spacer 27 made of, e.g., a synthetic resin and having a lead extracting hole near its center is placed on the electrode assembly 23 in the outer packaging can 21.

A metal cover 28 is airtightly joined to the upper-end opening of the outer packaging can 21 by, e.g., laser welding. An extraction hole 29 for a negative terminal is formed near the center of the cover 28. A negative terminal 30 is hermetically sealed to the hole 29 of the cover 28 via an insulating material 31 made of glass or resin. A lead 32 is connected to the lower end face of the negative terminal 30, and the other end of the lead 32 is connected to the negative electrode 24 of the electrode assembly 23. A liquid injection hole (not shown) is formed in that portion of the cover 28, which is separated from the extraction hole 29, and a nonaqueous electrolyte is injected into the outer packaging can 21 through this liquid injection hole. Note that the liquid injection hole is sealed by a sealing cover (not shown) after the nonaqueous electrolyte is injected.

Upper insulating paper 33 and lower insulating paper 34 cover the entire outer surface of the cover 28 and the bottom surface of the outer packaging can 21, respectively. A jacket tube 35 is so placed as to extend from the side surface of the outer packaging can 21 to the peripheries of the insulating papers 33 and 34 on the upper and lower surfaces, and fixes the upper insulating paper 33 and lower insulating paper 34 to the outer packaging can 21.

(3) Thin Nonaqueous Secondary Battery

Figure 3:
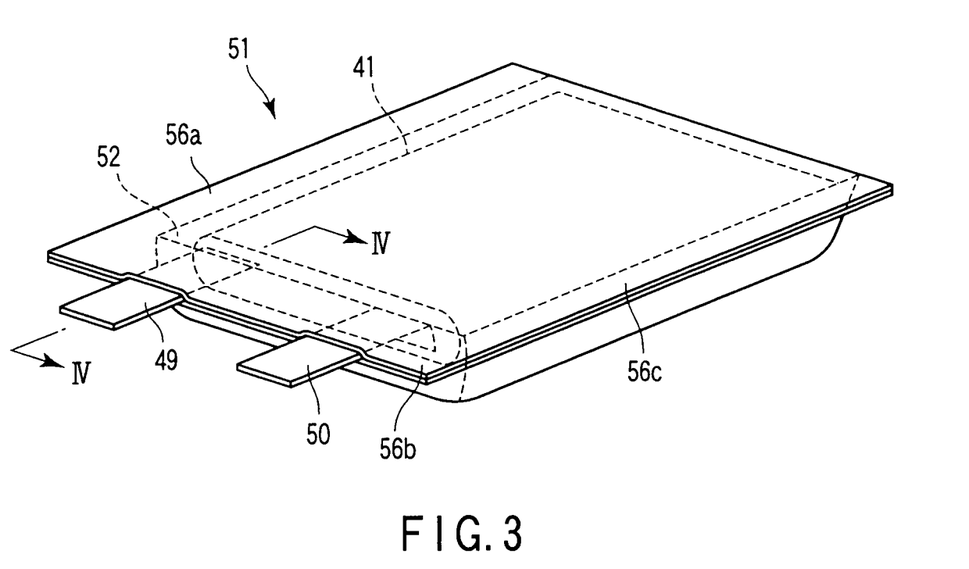
FIG. 3 is a perspective view showing a thin type-lithium ion secondary battery as still another form of the nonaqueous electrolyte secondary battery according to the present invention.
Figure 4:
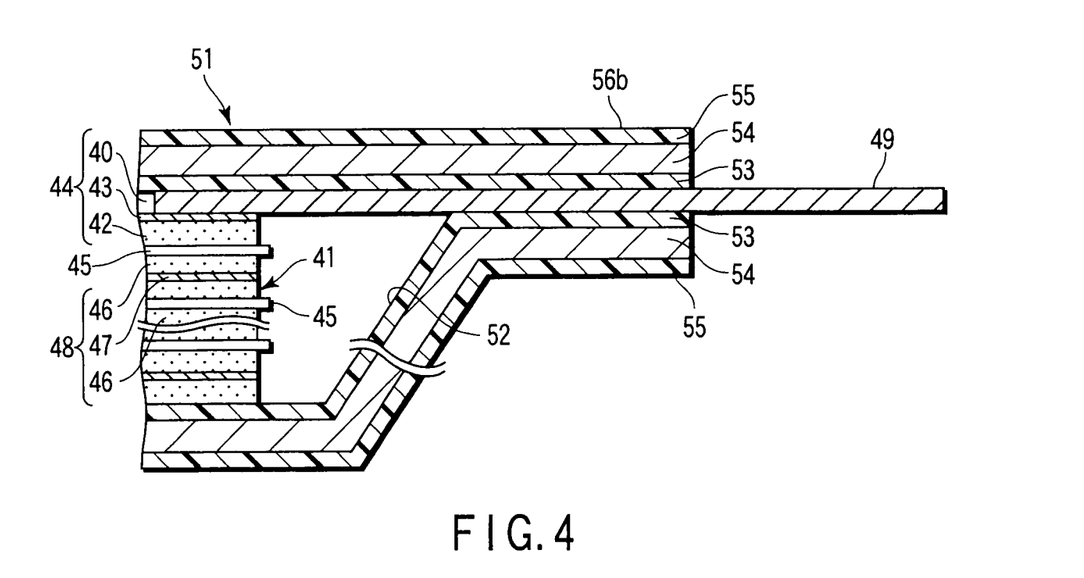
FIG. 4 is a sectional view taken along a line IV-IV in FIG. 3.

As shown in FIGS. 3 and 4, an electrode assembly 41 has, e.g., a flat rectangular shape obtained by spirally winding a positive electrode 44 having positive electrode active material layers 42 carried on the two surfaces of a current collector 43, a separator 45, a negative electrode 48 having negative electrode active material layers 46 carried on the two surfaces of a current collector 47, and a separator 45, and molding the resultant structure. External lead terminals 49 and 50 connected to the positive electrode 44 and negative electrode 48, respectively, extend outside from the same side surface of the electrode assembly 41.

As shown in FIG. 3, the electrode assembly 41 is enclosed in, e.g., a cup 52 of a cup-like jacket film 51 folded in two, such that the folded portion is positioned on the side surface opposite to the side surface from which the external lead terminals 49 and 50 extend. As shown in FIG. 4, the jacket film 51 has a structure in which a sealant film 53 positioned on the inner surface side, an aluminum or aluminum alloy foil 54, and a rigid organic resin film 55 are stacked in this order. Those three side portions, except for the folded portion, of the jacket film 51, which correspond to two long side surfaces and one short side surface of the electrode assembly 41 have seal portions 56a, 56b, and 56c extended in the horizontal direction by thermally sealing the sealant films 53, and the seal portions 56a, 56b, and 56c seal the electrode assembly 41. The external terminals 49 and 50 connected to the positive electrode 44 and negative electrode 48, respectively, extend outside through the seal portion 56b on the side opposite to the folded portion. A nonaqueous electrolyte is contained by impregnation in the electrode assembly 41 and in the jacket film 51 sealed by the seal portions 56a, 56b, and 56c.

Note that in the above thin nonaqueous electrolyte secondary battery, the jacket film is not limited to a cut type, and can also be a pillow type or a pouch type.

The nonaqueous electrolyte secondary battery of the first embodiment according to the present invention includes an electrode assembly having a high-density positive electrode having a positive electrode active material layer formed on at least one surface of a positive electrode current collector, a high-density negative electrode having a negative electrode active material layer formed on at least one surface of a negative electrode current collector, and a separator interposed between the positive and negative electrodes, has a structure in which the electrode assembly is impregnated with a nonaqueous electrolyte, and has an arrangement in which the specific surface area per unit area of the positive electrode active material layer of the positive electrode is 0.5 to 1.0 times the specific surface area per unit area of the negative electrode active material layer of the negative electrode. With this arrangement, it is possible to obtain a high-energy-density, nonaqueous electrolyte secondary battery in which the initial characteristics, particularly, the discharge characteristics when a large electric current is discharged stabilize, and the charge/discharge cycle characteristics improve.

Second Embodiment

This nonaqueous electrolyte secondary battery includes an electrode assembly having a high-density positive electrode obtained by forming a positive electrode active material layer on at least one surface of a positive electrode current collector, a high-density negative electrode obtained by forming a negative electrode active material layer on at least one surface of a negative electrode current collector, and a separator interposed between the positive and negative electrodes. This electrode assembly is impregnated with a nonaqueous electrolyte. The electrode assembly and nonaqueous electrolyte are contained in an outer packaging member.

The same high-density positive electrode, high-density negative electrode, separator, and nonaqueous electrolyte as explained in the first embodiment can be used.

In the positive electrode, a plurality of grooves are formed in the formation surface of the positive electrode active material such that the end portions of these grooves open at the edges of the positive electrode active material layer. These grooves are formed at a frequency of 1 to 10 grooves per mm as a length in the positive electrode active material layer, and the sectional area of the grooves accounts for a ratio of 1 to 20% of the sectional area of the positive electrode active material layer. The plurality of grooves are formed by, e.g., passing the positive electrode having the positive electrode active material between a pair of rolls at least one of which is an engraved emboss roll.

If the number of the plurality of grooves formed in the positive electrode active material layer is less than 1 per mm as a length, the effect of drawing the nonaqueous electrolyte to the positive electrode becomes unsatisfactory, and the nonaqueous electrolyte permeation distribution becomes nonuniform between the positive and negative electrodes. In contrast, if the number of the plurality of grooves formed in the positive electrode active material layer exceeds 10 per mm as a length, the strength of the positive electrode is reduced, and the positive electrode active material layer peels off from the current collector. The number of plurality of grooves formed in the positive electrode active material layer is more preferably 4 to 8 per mm as a length.

If the sectional area of the plurality of grooves is less than 1% of the sectional area of the positive electrode active material layer, the effect of drawing the nonaqueous electrolyte to the positive electrode becomes unsatisfactory, and the nonaqueous electrolyte permeation distribution becomes nonuniform between the positive and negative electrodes. On the other hand, if the sectional area of the plurality of grooves exceeds 20% of the sectional area of the positive electrode active material, the strength of the positive electrode is reduced, and the positive electrode active material layer peels off from the current collector. The sectional area of the plurality of grooves is more preferably 2 to 15% of the sectional area of the positive electrode active material.

The sectional shape of the groove is not particularly limited, and examples are an inverted trapezoidal shape, V-shape, and U-shape. However, to advance permeation of the electrolyte from the surface of the positive electrode active material layer, the sectional shape of the groove is preferably an inverted trapezoidal shape.

Figure 5:
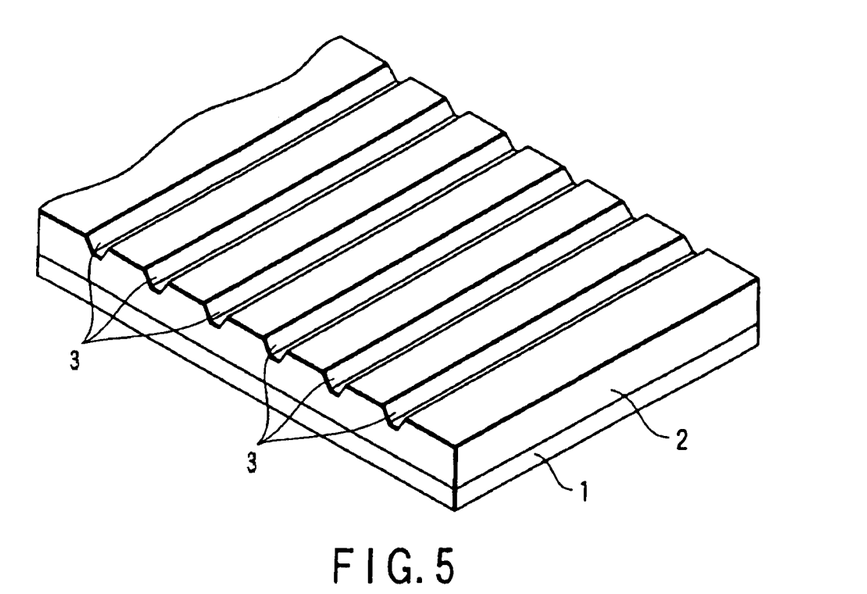
FIG. 5 is a perspective view showing a form of a positive electrode incorporated into the nonaqueous electrolyte secondary battery according to the present invention.
Figure 6:
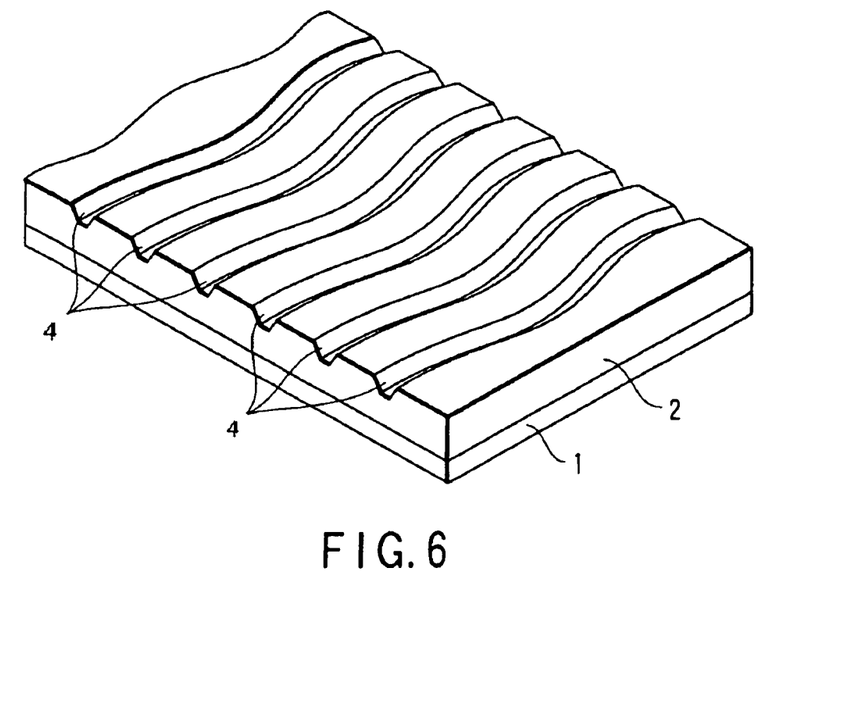
FIG. 6 is a perspective view showing another form of the positive electrode incorporated into the nonaqueous electrolyte secondary battery according to the present invention.

The groove can be a linear groove or curved groove. More specifically, as shown in FIG. 5, a plurality of linear grooves 3 having an inverted trapezoidal sectional shape are formed in a positive electrode active material layer 2 carried on one surface of a current collector 1. Alternatively, as shown in FIG. 6, a plurality of curved grooves 4 having an inverted trapezoidal sectional shape are formed in a positive electrode active material layer 2 carried on one surface of a current collector 1. However, to increase the specific surface area of the positive electrode active material layer, i.e., the contact area between the surface of the positive electrode active material layer and the nonaqueous electrolyte, it is preferable to form the curved grooves 4 having an inverted trapezoidal sectional shape in the positive electrode active material layer 2 as shown in FIG. 6.

Figure 7:
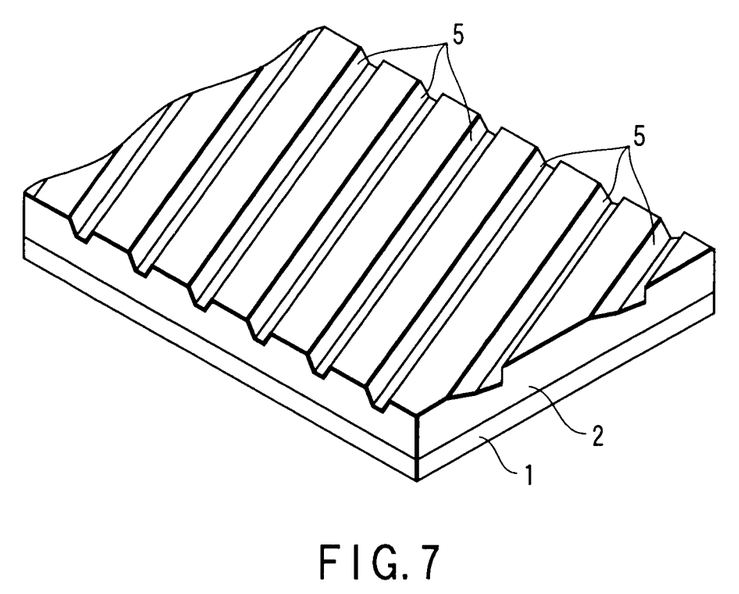
FIG. 7 is a perspective view showing still another form of the positive electrode incorporated into the nonaqueous electrolyte secondary battery according to the present invention.

When the linear or curved grooves are formed, they are preferably inclined in the longitudinal direction of the positive electrode. More specifically, as shown in FIG. 7, a plurality of linear grooves 5 having an inverted trapezoidal sectional shape are formed in a positive electrode active material layer 2 carried on one surface of a current collector 1, so as to be inclined to make an angle .theta. with the longitudinal direction of the current collector 1. This inclination angle (.theta.) is preferably 45 to 75°. By thus inclining the plurality of linear grooves 5 having an inverted trapezoidal sectional shape to make the angle .theta. with the longitudinal direction of the current collector 1, the specific surface area obtained by the formation of the grooves can be made larger than that when these grooves are not inclined. Note that curved grooves are also preferably inclined to the longitudinal direction of the positive electrode.

Figure 8:
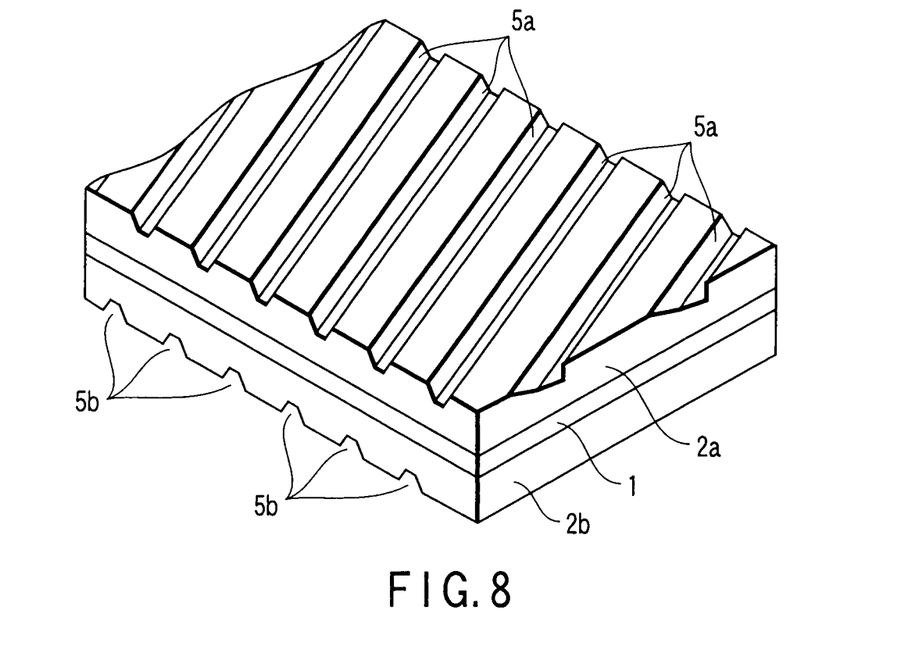
FIG. 8 is a perspective view showing still another form of the positive electrode incorporated into the nonaqueous electrolyte secondary battery according to the present invention.
Figure 9:
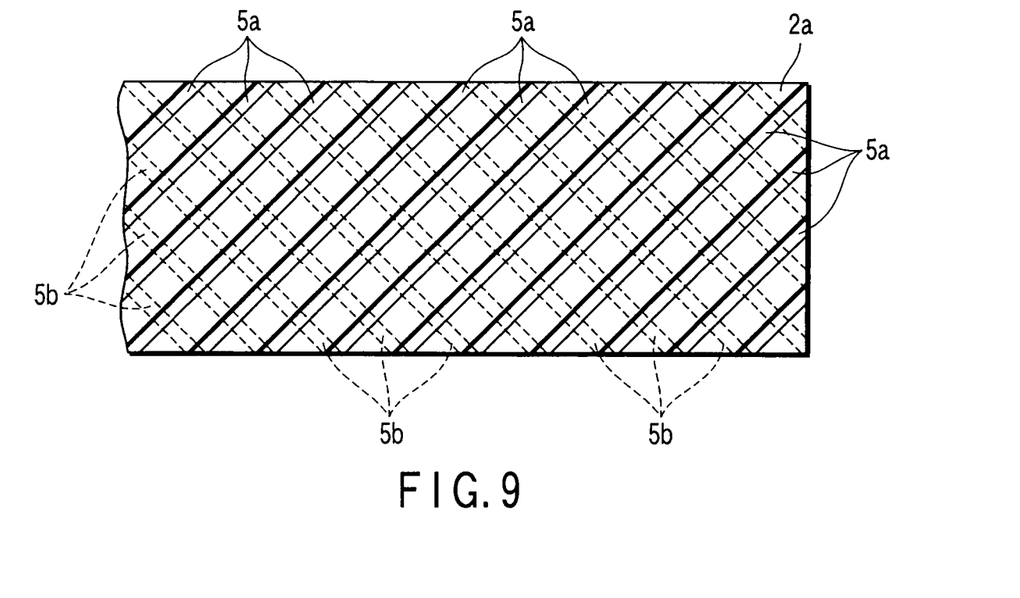
FIG. 9 is a plan view showing still another form of the positive electrode incorporated into the nonaqueous electrolyte secondary battery according to the present invention.

As shown in FIG. 8, it is also possible to carry positive electrode active material layers 2a and 2b on the upper and lower surfaces of a current collector 1, and form a plurality of linear grooves 5a and 5b having an inverted trapezoidal sectional shape in the positive electrode active material layers 2a and 2b, respectively, such that these grooves are inclined to the longitudinal direction of the current collector 1. When the plurality of grooves are thus formed in the positive electrode active material layers on the upper and lower surfaces of the current collector 1 so as to be inclined to the longitudinal direction of the current collector, as shown in FIG. 9, a plurality of linear grooves 5a and 5b having an inverted trapezoidal sectional shape are preferably formed in positive electrode active material layers 2a and 2b, respectively, on the upper and lower surfaces of a current collector 1, so as to cross each other when seen through one surface. By thus forming the plurality of linear grooves 5a and 5b having an inverted trapezoidal sectional shape in the positive electrode active material layers 2a and 2b, respectively, on the upper and lower surfaces of the current collector 1 so that these grooves cross each other when seen through one surface, it is possible to prevent stretching of one side of the positive electrode such as when the grooves are formed in the positive electrode active material layers on the upper and lower surfaces of the current collector so as to be parallel to each other when seen through one surface.

Examples of the nonaqueous electrolyte secondary battery according to the present invention are the cylindrical type shown in FIG. 1, the square type shown in FIG. 2, and the thin type shown in FIGS. 3 and 4 mentioned earlier.

As described above, the nonaqueous electrolyte secondary battery of the second embodiment according to the present invention includes an electrode assembly having a high-density positive electrode having a positive electrode active material layer formed on at least one surface of a positive electrode current collector, a high-density negative electrode having a negative electrode active material layer formed on at least one surface of a negative electrode current collector, and a separator interposed between the positive and negative electrodes, has a structure in which the electrode assembly is impregnated with a nonaqueous electrolyte, and has an arrangement in which a plurality of grooves are formed in the formation surface of the positive electrode active material layer of the positive electrode such that the end portions of these grooves open at the edges of the positive electrode active material layer, these grooves are formed at a frequency of 1 to 10 grooves per 1 as a length in the positive electrode active material layer, and the sectional area of the grooves accounts for a ratio of 1 to 20% of the sectional area of the positive electrode active material layer. With this arrangement, it is possible to obtain a high-energy-density, nonaqueous electrolyte secondary battery in which the initial characteristics, particularly, the discharge characteristics when a large electric current is discharged stabilize, and the charge/discharge cycle characteristics improve.

The present invention will be described in more detail below by way of its examples.

EXAMPLE 1

<Formation of Positive Electrode>

100 parts by weight of $LiCoO_2$ having an average particle diameter of 10 μm as a positive electrode active material, 2.5 parts by weight of graphite as a conductive material, and 2.5 parts by weight of acetylene black were mixed. This mixture and 3.5 parts by weight of polyvinylidene fluoride were kneaded to prepare a positive mix slurry. One surface of a 15-μm-thick piece of aluminum foil as a current collector was coated with this slurry, and the slurry was dried. In addition, the other surface of the aluminum foil was also coated with the slurry, and the slurry was dried, thereby forming positive electrode active material layers on the two surfaces of the aluminum foil. Then, the aluminum foil on the two surfaces of which the positive electrode active material layers were formed was molded into a predetermined thickness by roll press, thereby forming a band-like positive electrode having the positive electrode active material layers having a density of 3.2 g/cm$^3$ on its two surfaces. Subsequently, this band-like positive electrode was passed between engraved emboss rolls to form a plurality of linear grooves having an inverted trapezoidal sectional shape in the positive electrode active material layers on the two surfaces of the positive electrode.

In the obtained positive electrode, the plurality of grooves having an inverted trapezoidal sectional shape inclined to make an angle of 60° with the longitudinal direction of the positive electrode, and the frequency of these grooves was 8 grooves/mm. Note that the grooves having an inverted trapezoidal sectional shape formed in the two surfaces were inverted to cross each other when seen through one surface as shown in FIG. 9 mentioned earlier. Note also that the ratio occupied by the sectional area of the grooves in the sectional area of the positive electrode active material layer was found to be 5% by sectional observation of the positive electrode. Furthermore, as shown in the drawings, only one set of parallel grooves is formed in each positive electrode active material therefore to provide the exclusive texturization for each positive electrode active material.

<Formation of Negative Electrode>

Mesophase frequency-based carbon fibers were graphitized in an argon gas ambient at 3,000° C., and heat-treated in a chlorine gas ambient at 2,400° C., thereby synthesizing a graphitized carbon powder. Then, 100 parts by weight of the graphitized carbon powder and an N-methyl-2-pyrollidone solution in which 5 parts by weight of polyvinylidene fluoride were dissolved were mixed to prepare a negative mix slurry. The two surfaces of a 12-μm-thick piece of copper foil as a current collector were coated with this slurry, and the slurry was dried. After that, roll pressing was performed to form a band-like negative electrode having negative electrode active material layers having a density of 1.5 g/cm$^3$ on its two surfaces.

<Preparation of Nonaqueous Electrolyte>

A nonaqueous electrolyte was prepared by dissolving 1.2 mols/L of LiPF$_6$ in a nonaqueous solvent mixture in which propylene carbonate, ethylene carbonate, and methyl ethyl carbonate were mixed at a volume ratio of 2:3:1.

<Assembly of Battery>

Aluminum ribbon as a current collector tab was ultrasonically welded to a predetermined position of the positive electrode. Also, a polyimide protection tape for preventing a short circuit was made of adhere to the welded portion of the negative electrode. These positive and negative electrodes were wound via a separator made of a porous polypropylene film, thereby forming a cylindrical electrode assembly.

The electrode assembly and nonaqueous electrolyte were accommodated in a closed-end, cylindrical outer packaging can made of a metal, and a sealing plate made of an insulating material and having a positive terminal was airtightly attached to the opening of this outer packaging can. A cylindrical lithium ion secondary battery having the structure shown in FIG. 1 described earlier was assembled by electrically connecting the current collector tag of the positive electrode of the electrode assembly to the positive terminal.

EXAMPLES 2-5

Band-like positive electrodes, similar to that of Example 1, each having positive electrode active material layers having a density of 3.2 g/cm$^3$ on its two surfaces were passed through engraved emboss rolls to form a plurality of grooves in the positive electrode active material layers on the two surfaces of each positive electrode while the depth of these grooves was changed.

In the four obtained positive electrodes, the plurality of linear grooves having an inverted trapezoidal sectional shape inclined to make an angle of 60° with the longitudinal direction of the positive electrode, and the frequency of these grooves was 8 grooves/mm. Note that these grooves formed in the two surfaces were inverted to cross each other when seen through one surface as shown in FIG. 9 mentioned earlier. Note also that the ratios occupied by the sectional areas of the grooves in the sectional areas of the positive electrode active material layers were found to be 1%, 2%, 15%, and 20% by sectional observation of the positive electrodes.

Four cylindrical lithium ion secondary batteries having the structure shown in FIG. 1 described earlier were assembled following the same procedure as in Example 1 except that the positive electrodes as described above were used.

EXAMPLES 6-8

Band-like positive electrodes, similar to that of Example 1, each having positive electrode active material layers having a density of 3.2 g/cm$^3$ on its two surfaces were passed through engraved emboss rolls to form a plurality of grooves in the positive electrode active material layers on the two surfaces of each positive electrode while the depth and number of these grooves were changed.

In the three obtained positive electrodes, the plurality of linear grooves having an inverted trapezoidal sectional shape inclined to make an angle of 60° with the longitudinal direction of the positive electrode, and the frequencies of these grooves were 1 groove/mm, 4 grooves/mm, and 10 grooves/mm. Note that these grooves formed in the two surfaces were inverted to cross each other when seen through one surface as shown in FIG. 9 mentioned earlier. Note also that the ratio occupied by the sectional area of the grooves in the sectional area of the positive electrode active material layer of each positive electrode was found to be 5% by sectional observation of the positive electrode.

Three cylindrical lithium ion secondary batteries having the structure shown in FIG. 1 described earlier were assembled following the same procedure as in Example 1 except that the positive electrodes as described above were used.

EXAMPLES 9-13

Band-like positive electrodes, similar to that of Example 1, each having positive electrode active material layers having a density of 3.2 g/cm³ on its two surfaces were passed through engraved emboss rolls to form a plurality of grooves in the positive electrode active material layers on the two surfaces of each positive electrode while the depth of these grooves was changed.

In the five obtained positive electrodes, the plurality of curved grooves having an inverted trapezoidal sectional shape inclined to make an angle of 60° with the longitudinal direction of the positive electrode, and the frequency of these grooves was 8 grooves/mm. Note that these grooves formed in the two surfaces were inverted to cross each other when seen through one surface. Note also that the ratios occupied by the sectional areas of the grooves in the sectional areas of the positive electrode active material layers were found to be 1%, 2%, 5%, 15%, and 20% by sectional observation of the positive electrodes.

Five cylindrical lithium ion secondary batteries having the structure shown in FIG. 1 described earlier were assembled following the same procedure as in Example 1 except that the positive electrodes as described above were used.

EXAMPLES 14-16

Band-like positive electrodes, similar to that of Example 1, each having positive electrode active material layers having a density of 3.2 g/cm³ on its two surfaces were passed through engraved emboss rolls to form a plurality of grooves in the positive electrode active material layers on the two surfaces of each positive electrode while the depth and number of these grooves were changed.

In the three obtained positive electrodes, the plurality of curved grooves having an inverted trapezoidal sectional shape inclined to make an angle of 60° with the longitudinal direction of the positive electrode, and the frequencies of these grooves were 1 groove/mm, 4 grooves/mm, and 10 grooves/mm. Note that these grooves formed in the two surfaces were inverted to cross each other when seen through one surface. Note also that the ratio occupied by the sectional area of the grooves in the sectional area of the positive electrode active material layer of each positive electrode was found to be 5% by sectional observation of the positive electrode.

Three cylindrical lithium ion secondary batteries having the structure shown in FIG. 1 described earlier were assembled following the same procedure as in Example 1 except that the positive electrodes as described above were used.

EXAMPLE 17

A band-like positive electrode having positive electrode active material layers having a density of 3.0 g/cm³ on its two surfaces was formed following the same procedure as in Example 1. This positive electrode was passed through engraved emboss rolls to form a plurality of grooves in the positive electrode active material layers on the two surfaces of the positive electrode.

In the obtained positive electrode, the plurality of linear grooves having an inverted trapezoidal sectional shape inclined to make an angle of 60° with the longitudinal direction of the positive electrode, and the frequency of these grooves was 8 grooves/mm. Note that these grooves formed in the two surfaces were inverted to cross each other when seen through one surface as shown in FIG. 9 mentioned earlier. Note also that the ratio occupied by the sectional area of the grooves in the sectional area of the positive electrode active material layer was found to be 5% by sectional observation of the positive electrode.

A cylindrical lithium ion secondary battery having the structure shown in FIG. 1 described earlier was assembled following the same procedure as in Example 1 except that the positive electrode as described above was used.

COMPARATIVE EXAMPLE 1

A positive electrode having a density of 3.2 g/cm³ was formed following the same procedure as in Example 1. A cylindrical lithium ion secondary battery having the structure shown in FIG. 1 described earlier was assembled following the same procedure as in Example 1 except that this positive electrode (a positive electrode having no grooves) was used.

COMPARATIVE EXAMPLES 2 & 3

Band-like positive electrodes, similar to that of Example 1, each having positive electrode active material layers having a density of 3.2 g/cm³ on its two surfaces were passed through engraved emboss rolls to form a plurality of grooves in the positive electrode active material layers on the two surfaces of each positive electrode while the depth of these grooves was changed.

In the two obtained positive electrodes, the plurality of linear grooves having an inverted trapezoidal sectional shape inclined to make an angle of 60° with the longitudinal direction of the positive electrode, and the frequency of these grooves was 8 grooves/mm. Note that these grooves formed in the two surfaces were inverted to cross each other when seen through one surface as shown in FIG. 9 mentioned earlier. Note also that the ratios occupied by the sectional areas of the grooves in the sectional areas of the positive electrode active material layers were found to be 0.5% and 25%, which fell outside the range (1 to 20%) of the present invention, by sectional observation of the positive electrodes.

Two cylindrical lithium ion secondary batteries having the structure shown in FIG. 1 described earlier were assembled following the same procedure as in Example 1 except that the positive electrodes as described above were used.

COMPARATIVE EXAMPLES 4 & 5

Band-like positive electrodes, similar to that of Example 1, each having positive electrode active material layers having a density of 3.2 g/cm³ on its two surfaces were passed through engraved emboss rolls to form a plurality of grooves in the positive electrode active material layers on the two surfaces of each positive electrode while the depth and number of these grooves were changed.

In the two obtained positive electrodes, the plurality of linear grooves having an inverted trapezoidal sectional shape inclined to make an angle of 60° with the longitudinal direction of the positive electrode, and the frequencies of these grooves were 0.5 grooves/mm and 15 grooves/mm which fell outside the range (1 to 10 grooves/mm) of the present invention. Note that these grooves formed in the two surfaces were inverted to cross each other when seen through one surface as shown in FIG. 9 mentioned earlier. Note also that the ratio occupied by the sectional area of the grooves in the sectional area of the positive electrode active material layer of each positive electrode was found to be 5% by sectional observation of the positive electrode.

Two cylindrical lithium ion secondary batteries having the structure shown in FIG. 1 described earlier were assembled following the same procedure as in Example 1 except that the positive electrodes as described above were used.

COMPARATIVE EXAMPLE 6

A band-like positive electrode having positive electrode active material layers having a density of 2.8 g/cm$^3$ on its two surfaces was formed following the same procedure as in Example 1. This positive electrode was passed through engraved emboss rolls to form a plurality of grooves in the positive electrode active material layers on the two surfaces of the positive electrode.

In the obtained positive electrode, the plurality of linear grooves having an inverted trapezoidal sectional shape inclined to make an angle of 60° with the longitudinal direction of the positive electrode, and the frequency of these grooves was 8 grooves/mm. Note that these grooves formed in the two surfaces were inverted to cross each other when seen through one surface. Note also that the ratio occupied by the sectional area of the grooves in the sectional area of the positive electrode active material layer was found to be 5% by sectional observation of the positive electrode.

A cylindrical lithium ion secondary battery having the structure shown in FIG. 1 described earlier was assembled following the same procedure as in Example 1 except that the positive electrode as described above was used.

The battery characteristics of the assembled cylindrical lithium ion secondary batteries of Examples 1 to 17 and Comparative Examples 1 to 6 were evaluated by the method explained below.

1) Charge/Discharge Cycle Test

Charge was performed with a constant electric current of 1 C until 4.2 V at a temperature of 20° C., and, after 4.2 V was reached, performed with a constant voltage such that the total charging time was 3 hrs. Discharge was performed with a constant electric current of 1 C until 3.0 V at the same temperature. A cycle test was conducted by repeating this charge/discharge, and the number of cycles was measured when the discharge capacity reached 80% of the discharge capacity in the first cycle. Note that in this charge/discharge cycle test, the number of cycles of the secondary battery of each example and each comparative example was obtained as a relative value with respect to 100 as the number of cycles of the secondary battery of Example 1.

The results are shown in Tables 1 to 4 below. Note that Tables 2 and 4 also show the multiple (specific surface area of positive electrode active material layer/specific surface area of negative electrode active material layer) of the specific surface area per unit area of the positive electrode active material layer of the positive electrode to the specific surface area per unit area of the negative electrode active material layer of the negative electrode which opposed the positive electrode with the separator sandwiched between them in the secondary battery of each of Examples 1 to 17 and Comparative Examples 1 to 6.

TABLE 1

|  | Positive electrode density (g/cm$^3$) | Groove pattern | Groove frequency (number/mm) | Sectional area of grooves (%) |
|---|---|---|---|---|
| Example 1 | 3.2 | Inclined and linear | 8 | 5 |
| Example 2 | 3.2 | Inclined and linear | 8 | 1 |
| Example 3 | 3.2 | Inclined and linear | 8 | 2 |
| Example 4 | 3.2 | Inclined and linear | 8 | 15 |
| Example 5 | 3.2 | Inclined and linear | 8 | 20 |
| Example 6 | 3.2 | Inclined and linear | 1 | 5 |
| Example 7 | 3.2 | Inclined and linear | 4 | 5 |
| Example 8 | 3.2 | Inclined and linear | 10 | 5 |
| Example 9 | 3.2 | Inclined and curved | 8 | 1 |
| Example 10 | 3.2 | Inclined and curved | 8 | 2 |
| Example 11 | 3.2 | Inclined and curved | 8 | 5 |
| Example 12 | 3.2 | Inclined and curved | 8 | 15 |
| Example 13 | 3.2 | Inclined and curved | 8 | 20 |

TABLE 2

|  | Multiple of specific surface area of positive electrode to negative electrode | Number of charge/discharge cycles |
|---|---|---|
| Example 1 | 0.60 | 100 |
| Example 2 | 0.56 | 96 |
| Example 3 | 0.57 | 97 |
| Example 4 | 0.80 | 103 |
| Example 5 | 0.95 | 107 |
| Example 6 | 0.55 | 96 |
| Example 7 | 0.57 | 98 |
| Example 8 | 0.62 | 102 |
| Example 9 | 0.57 | 98 |
| Example 10 | 0.59 | 100 |
| Example 11 | 0.62 | 102 |
| Example 12 | 0.84 | 106 |
| Example 13 | 1.00 | 110 |

TABLE 3

|  | Positive electrode density (g/cm$^3$) | Groove pattern | Groove frequency (number/mm) | Sectional area of grooves (%) |
|---|---|---|---|---|
| Example 14 | 3.2 | Inclined and curved | 1 | 5 |
| Example 15 | 3.2 | Inclined and curved | 4 | 5 |
| Example 16 | 3.2 | Inclined and curved | 10 | 5 |
| Example 17 | 3.0 | Inclined and linear | 8 | 5 |
| Comparative Example 1 | 3.2 | No grooves | No grooves | No grooves |
| Comparative Example 2 | 3.2 | Inclined and linear | 8 | 0.5 |
| Comparative Example 3 | 3.2 | Inclined and linear | 8 | 25 |
| Comparative Example 4 | 3.2 | Inclined and linear | 0.5 | 5 |
| Comparative Example 5 | 3.2 | Inclined and linear | 15 | 5 |
| Comparative Example 6 | 2.8 | Inclined and linear | 8 | 5 |

TABLE 4

|  | Multiple of specific surface area of positive electrode to negative electrode | Number of charge/discharge cycles |
|---|---|---|
| Example 14 | 0.57 | 97 |
| Example 15 | 0.60 | 99 |
| Example 16 | 0.65 | 104 |
| Example 17 | 0.63 | 99 |
| Comparative Example 1 | 0.30 | 80 |
| Comparative Example 2 | 0.38 | 85 |
| Comparative Example 3 | 1.20 | 88 |
| Comparative Example 4 | 0.40 | 83 |
| Comparative Example 5 | 1.10 | 87 |
| Comparative Example 6 | 1.05 | 78 |

As shown in Tables 1 to 4 above, good characteristics were obtained in the charge/discharge test by the secondary batteries of Examples 1 to 17 of the present invention each including the positive electrode (the magnification of the specific surface area per unit area of the positive electrode active material layer to the specific surface area per unit area of the negative electrode active material layer of the negative electrode was 0.5 to 1.0) in which 1 to 10 grooves were formed per 1 as a length in the positive electrode active material layer, and the ratio of the sectional area of these grooves was 1 to 20% of the sectional area of the positive electrode active material layer.

In contrast, the charge/discharge cycle characteristics deteriorated in the secondary batteries of Comparative Examples 2 and 4 each including the positive electrode in which the number per 1 mm as a length or the sectional area of grooves formed in the positive electrode active material layer was smaller than the lower limit of the range of the present invention. This is so because in each of the secondary batteries of Comparative Examples 2 and 4, the nonaqueous solution could not well permeate into the high-density positive electrode, and this produced a nonuniform nonaqueous electrolyte distribution between the positive and negative electrodes.

In further contrast, in each of the secondary batteries of Comparative Examples 3 and 5 in which the number per mm as a length or the sectional area of grooves formed in the positive electrode active material layer exceeded the upper limit of the range of the present invention, destruction of the positive electrode active material layer advanced, so the charge/discharge cycle characteristics deteriorated.

Furthermore, in the secondary battery of Comparative Example 6 including the positive electrode in which the density of the positive electrode active material layer was less than 3.0 g/cm$^3$, and the specific surface area of positive electrode active material layer/specific surface area of negative electrode active material layer was 1.05 which was larger than 1, the charge/discharge cycle characteristics deteriorated although appropriate grooves were formed in the positive electrode active material layer.

EXAMPLES 18 & 19

Band-like positive electrodes, similar to that of Example 1, each having positive electrode active material layers having a density of 3.2 g/cm$^3$ on its two surfaces were passed through engraved emboss rolls to form a plurality of grooves in the positive electrode active material layers on the two surfaces of each positive electrode while the angle to the longitudinal direction was changed.

In the two obtained positive electrodes, the plurality of linear grooves having an inverted trapezoidal sectional shape inclined to make angles of 45° and 75° with the longitudinal direction of each positive electrodes, the frequency of these grooves was 8 grooves/mm, and the ratio occupied by the sectional area of the grooves in the sectional area of the positive electrode active material layer was 5%. Note that these grooves formed in the two surfaces were inverted to cross each other when seen through one surface as shown in FIG. 9 mentioned earlier.

Two cylindrical lithium ion secondary batteries having the structure shown in FIG. 1 described earlier were assembled following the same procedure as in Example 1 except that the positive electrodes as described above were used.

The battery characteristics (charge/discharge cycle characteristics) of the assembled cylindrical lithium ion secondary batteries of Examples 18 and 19 were evaluated by the same method as in Example 1. The results are shown in Tables 5 and 6 below. Note that Tables 5 and 6 also show the multiple (specific surface area of positive electrode active material layer/specific surface area of negative electrode active material layer) of the specific surface area per unit area of the positive electrode active material layer of the positive electrode to the specific surface area per unit area of the negative electrode active material layer of the negative electrode which opposed the positive electrode with the separated sandwiched between them in the secondary battery of each of Examples 18 and 19. Note also that the evaluation results of the secondary battery of Example 1 are also shown.

TABLE 5

| | Positive electrode density (g/cm³) | Groove pattern | Groove frequency (number/mm) | Sectional area of grooves (%) |
|---|---|---|---|---|
| Example 1 | 3.2 | Inclined at 60° | 8 | 5 |
| Example 18 | 3.2 | Inclined at 45° | 8 | 5 |
| Example 19 | 3.2 | Inclined at 45° | 8 | 5 |

TABLE 6

| | Multiple of specific surface area of positive electrode to negative electrode | Number of charge/discharge cycles |
|---|---|---|
| Example 1 | 0.60 | 100 |
| Example 18 | 0.60 | 96 |
| Example 19 | 0.60 | 95 |

As shown in FIGS. 5 and 6, good characteristics were obtained in the charge/discharge test by the secondary batteries of Examples 18 and 19 of the present invention in each of which the positive electrode (the magnification of the specific surface area per unit area of the positive electrode active material layer to the specific surface area per unit area of the negative electrode active material layer of the negative electrode was 0.5 to 1.0) in which 1 to 10 grooves were formed per mm as a length in the positive electrode active material layer, and the ratio of the sectional area of these grooves was 1 to 20% of the sectional area of the positive electrode active material layer was formed, and the grooves made an angle of 45° to 75° with the longitudinal direction of the positive electrode.

The invention claimed is:

1. A nonaqueous electrolyte secondary battery comprising:
an electrode assembly comprising
a high-density positive electrode in which a first positive electrode active material layer and a second positive electrode active material layer are formed on respective opposite surfaces of a band-like positive electrode current collector,
a high-density negative electrode in which a negative electrode active material layer is formed on at least one surface of a negative electrode current collector;
a band-like first separator interposed between the positive and negative electrodes; and
a band-like second separator arranged either the surface of the high-density positive electrode located on opposite side of the first separator or the surface of the high-density negative electrode located on opposite side of the first separator, and
a nonaqueous electrolyte impregnated in the first and the second separators,
the high-density positive electrode, the high-density negative electrode, the first separator and the second separator being spirally wound,
the first positive electrode active material layer having a surface groove texturization consisting exclusively of a set of plural parallel first grooves, each of the first grooves having end portions opened at sides of the first positive electrode active material layer,
the second positive electrode active material layer having a surface groove texturization consisting exclusively of a set of plural parallel second grooves, each of the second grooves having end portions opened at sides of the second positive electrode active material layer,
a direction of each of the first grooves, which is extended from one end portion of each of the first grooves to an other end portion of each of the first grooves, is inclined to make a first inclination angle with a longitudinal direction of the positive electrode,
a direction of each of the second grooves, which is extended from one end portion of each of the second grooves to an other end portion of each of the second grooves, is inclined to make a second inclination angle with a longitudinal direction of the positive electrode, and
said first and second inclination angles selected so that said first and second grooves cross each other in orthogonal projections thereof through a planar surface of the positive electrode when viewed from above the planar surface.

2. A nonaqueous electrolyte secondary battery according to claim 1, wherein the high-density positive electrode has a density of not less than 3.0 g/cm³, and the high-density negative electrode has a density of not less than 1.3 g/cm³.

3. A nonaqueous electrolyte secondary battery according to claim 1, wherein the first and second grooves have an inverted trapezoidal sectional shape.

4. A nonaqueous electrolyte secondary battery according to claim 1, wherein the inclination angles of the directions of the first and second grooves is 45 to 75°.

5. A nonaqueous electrolyte secondary battery according to claim 1, wherein each of the first and second grooves is formed as a curved line in the surface of each of the first and second positive electrode active material layers.

6. A nonaqueous electrolyte secondary battery according to claim 1, wherein each of the first and second grooves is formed as a liner line in the surface of each of the first and second positive electrode active material layers.

7. A nonaqueous electrolyte secondary battery according to claim 1, wherein the first and second grooves are formed in the surface of each of the first and second positive electrode material layers at a frequency of 1 to 10 grooves per mm as a length of each of the first and second positive electrode active material layers, and a sectional area of each of the first and second grooves, as viewed in a length direction of the first and second grooves, accounts for a ratio of 1 to 20% of a sectional area of each of the first and second positive electrode active material layers as viewed in the length direction of each of the first and second the grooves.

* * * * *